(12) United States Patent
Yamamoto et al.

(10) Patent No.: US 8,502,411 B2
(45) Date of Patent: Aug. 6, 2013

(54) POWER LIMITING APPARATUS FOR ELECTRIC SYSTEM, POWER LIMITING METHOD FOR ELECTRIC SYSTEM AND ELECTRIC SYSTEM

(75) Inventors: Masaya Yamamoto, Kasugai (JP); Itaru Seta, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 230 days.

(21) Appl. No.: 13/093,330

(22) Filed: Apr. 25, 2011

(65) Prior Publication Data

US 2011/0266868 A1 Nov. 3, 2011

(30) Foreign Application Priority Data

Apr. 28, 2010 (JP) ................. 2010-103624

(51) Int. Cl.
*B60L 1/00* (2006.01)
*B60L 3/00* (2006.01)
*H02G 3/00* (2006.01)

(52) U.S. Cl.
USPC ........................................ 307/10.1

(58) Field of Classification Search
USPC ............. 307/10.1, 10.7; 320/134; 180/65.29
See application file for complete search history.

(56) References Cited

U.S. PATENT DOCUMENTS

2006/0022642 A1* 2/2006 McGee et al. ................ 320/132

FOREIGN PATENT DOCUMENTS

| JP | 2008-109840 A | 5/2008 |
| JP | 2008-118790 A | 5/2008 |
| JP | 2008-199781 A | 8/2008 |
| JP | 2009-071902 A | 4/2009 |
| JP | 2009-247152 A | 10/2009 |
| JP | 2010-022128 A | 1/2010 |
| JP | 2010-035309 A | 2/2010 |

OTHER PUBLICATIONS

Office Action mailed Feb. 28, 2012 of Japanese Patent Application No. 2010-103024 and English translation thereof.

* cited by examiner

*Primary Examiner* — Carlos Amaya
(74) *Attorney, Agent, or Firm* — Kenyon & Kenyon LLP

(57) ABSTRACT

In a first condition, the sum of discharging power from a first battery stack and discharging power from a second battery stack is limited in accordance with the sum of a limit value of discharging power from the first battery stack and a limit value of discharging power from the second battery stack. In a second condition, electric power of the battery stacks is limited in accordance with either the limit value of discharging power from the first battery stack or the limit value of discharging power from the second battery stack.

9 Claims, 9 Drawing Sheets

POWER LIMITING APPARATUS FOR ELECTRIC SYSTEM, POWER LIMITING METHOD FOR ELECTRIC SYSTEM AND ELECTRIC SYSTEM

This nonprovisional application is based on Japanese Patent Application No. 2010-103624 filed on Apr. 28, 2010 with the Japan Patent Office, the entire contents of which are hereby incorporated by reference.

BACKGROUND OF THE INVENTION

1. Field of the Invention

The present invention relates to a power limiting apparatus for an electric system, a power limiting method for an electric system and an electric system, and more particularly to a technique of limiting electric power of a power storage system provided with a plurality of power storage devices.

2. Description of the Background Art

Conventionally, an electric vehicle equipped with an electric motor as a driving source is known. Such a vehicle is equipped with a power storage device that stores electric power, such as a battery and a capacitor. Electric power stored in the power storage device is supplied to the electric motor. The electric motor is controlled so as to output desired power.

One problem with the electric vehicle lies in that the distance that the vehicle can run on a single charge is shorter than in a vehicle having an internal combustion engine as a driving source. One solution for extending the distance that the vehicle can run is to increase the total capacity of the vehicle such as by mounting thereon a plurality of power storage devices, for example.

Another problem with the electric vehicle is to protect a power storage device against overdischarging and overcharging. For example, when the state of charge of the power storage device is low, output power of the electric motor is preferably limited so as to avoid overdischarging. When the state of charge of the power storage device is high, electric power to be charged into the power storage device is preferably limited so as to avoid overcharging. To suitably limit the output power of the electric motor and the electric power to be charged into the power storage device, the state of charge of the power storage device needs to be monitored.

Japanese Patent Laying-Open No. 2010-22128 discloses a charge/discharge control system for a power storage device in which, when any one of a plurality of power storage devices subjected to charge/discharge control as a whole has a state of charge value exceeding a charge limit value, all of the plurality of power storage devices are forcefully discharged, or when any one of the power storage devices has a state of charge value exceeding a discharge limit value, all of the plurality of power storage devices are forcefully charged.

In the case of controlling charging/discharging as a whole, it is necessary to limit charging power or discharging power not to be excessively large. However, even with the total charging power or discharging power into/from the plurality of power storage devices being limited, charging power or discharging power into/from each of the power storage devices is not necessarily limited to a limit value or below. For example, in a system in which a plurality of power storage devices are connected in parallel, a charging current or a discharging current into/from each of the power storage devices may vary when an internal resistance varies. A charging current or a discharging current into/from a power storage device having a low internal resistance may be larger than a charging current or a discharging current into/from a power storage device having a high internal resistance. As a result, charging power or discharging power into/from the power storage device having a low internal resistance may be larger than charging power or discharging power into/from the power storage device having a high internal resistance. In this case, even with charging power or discharging power into/from the plurality of power storage devices as a whole being limited, charging power or discharging power into/from the power storage device having a low internal resistance is not necessarily limited suitably.

In contrast, when limiting electric power in accordance with the state of each power storage device as in the charge/discharge control system disclosed in Japanese Patent Laying-Open No. 2010-22128, electric power is easily limited. This may result in shortage of electric power consumed for the vehicle to run, that is, the driving force of the vehicle.

SUMMARY OF THE INVENTION

The present invention has an object to achieve compatibility between limitation of electric power and ensuring of electric power.

A power limiting apparatus for an electric system is a power limiting apparatus for an electric system including an electric motor mounted on a vehicle as a driving source and a plurality of power storage devices electrically connected to the electric motor. The power limiting apparatus includes means for calculating a limit value of electric power of each of the power storage devices, and limitation means for limiting a sum of electric power of the plurality of the power storage devices in accordance with a sum of a plurality of the limit values in a first condition in which the electric motor is controlled so as to generate a driving force, and limiting electric power of the power storage devices in accordance with any of the plurality of the limit values in a second condition in which the electric motor is controlled so as to generate a braking force.

According to this structure, in the first condition in which the electric motor is driven so as to generate the driving force, electric power of the overall system is limited. In the second condition in which the electric motor is driven so as to generate the braking force, electric power is limited in accordance with any of the plurality of the limit values. Thus, a suitable control mode is selected depending on the condition. When electric power of the overall system is limited, the electric motor is supplied with electric power in a range available for the overall system. Electric power sufficient for the vehicle to run can thus be ensured. When electric power is limited in accordance with any of the plurality of the limit values, electric power is limited for each of the power storage devices. This ensures that electric power of each of the power storage devices is limited. For example, each of the power storage devices can be protected against overdischarging that would be caused by electric power generated by regenerative braking. As a result, compatibility between limitation of electric power and ensuring of sufficient electric power can be achieved.

In an embodiment, the vehicle has mounted thereon an air conditioning device electrically connected to the electric system. The second condition further includes a condition in which the air conditioning device is operated during a stop of the vehicle, in addition to the condition in which the electric motor is controlled so as to generate the braking force.

According to this structure, when the air conditioning device is operated during a stop of the vehicle, electric power is limited for each of the power storage devices. Accordingly, each of the power storage devices can be protected against overdischarging that would be caused by operating the air conditioning device with large electric power for cooling in hot climates.

In another embodiment, the limitation means, in the second condition, limits the sum of electric power of the plurality of the power storage devices in accordance with one of the plurality of the limit values that has a smaller absolute value.

According to this structure, electric power of the overall system is limited in accordance with a limit value having a smaller absolute value, so that electric power of each of the power storage devices is limited. Accordingly, each of the power storage devices is protected against overdischarging or overcharging.

In yet another embodiment, the limitation means, in the first condition in addition to the second condition, limits electric power of the power storage devices in accordance with any of the plurality of the limit values.

According to this structure, in the first condition, electric power of the overall system is limited, while electric power is limited for each of the power storage devices. This ensures that electric power of each of the power storage devices is limited even if electric power of any of the power storage devices alone becomes excessively large due to the difference in internal resistance between the power storage devices or the like when the electric motor is supplied with electric power in a range available for the overall system.

In yet another embodiment, the limitation means, in the first condition, limits the sum of electric power of the plurality of the power storage devices in accordance with the sum of the plurality of the limit values and limits electric power of each of the power storage devices in accordance with each of the limit values, and in the second condition, limits the sum of electric power of the plurality of the power storage devices in accordance with one of the plurality of the limit values that has a smaller absolute value.

According to this structure, in the first condition, electric power of the overall system is limited, while electric power of each of the power storage devices is limited in accordance with each of the limit values. This ensures that electric power of each of the power storage devices is limited even if electric power of any of the power storage devices alone increases due to the difference in internal resistance or the like when the electric motor is supplied with electric power in a range available for the overall system. In the second condition, electric power of the overall system is limited in accordance with a limit value having a smaller absolute value, so that electric power of each of the power storage devices is limited. Accordingly, each of the power storage devices is protected against overdischarging or overcharging.

In yet another embodiment, the limitation means, in the second condition, limits the sum of electric power of the plurality of the power storage devices in accordance with one of the plurality of the limit values that has a smaller absolute value, and limits electric power of each of the power storage devices in accordance with each of the limit values.

According to this structure, in the second condition, electric power of the overall system is limited in accordance with a limit value having a smaller absolute value, while electric power of each of the power storage devices is limited in accordance with each of the limit values. This ensures that electric power of each of the power storage devices is limited even if electric power of any of the power storage devices alone increases due to the difference in internal resistance between the power storage devices or the like although electric power of the overall system is limited in accordance with each of the limit values of each of the power storage devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
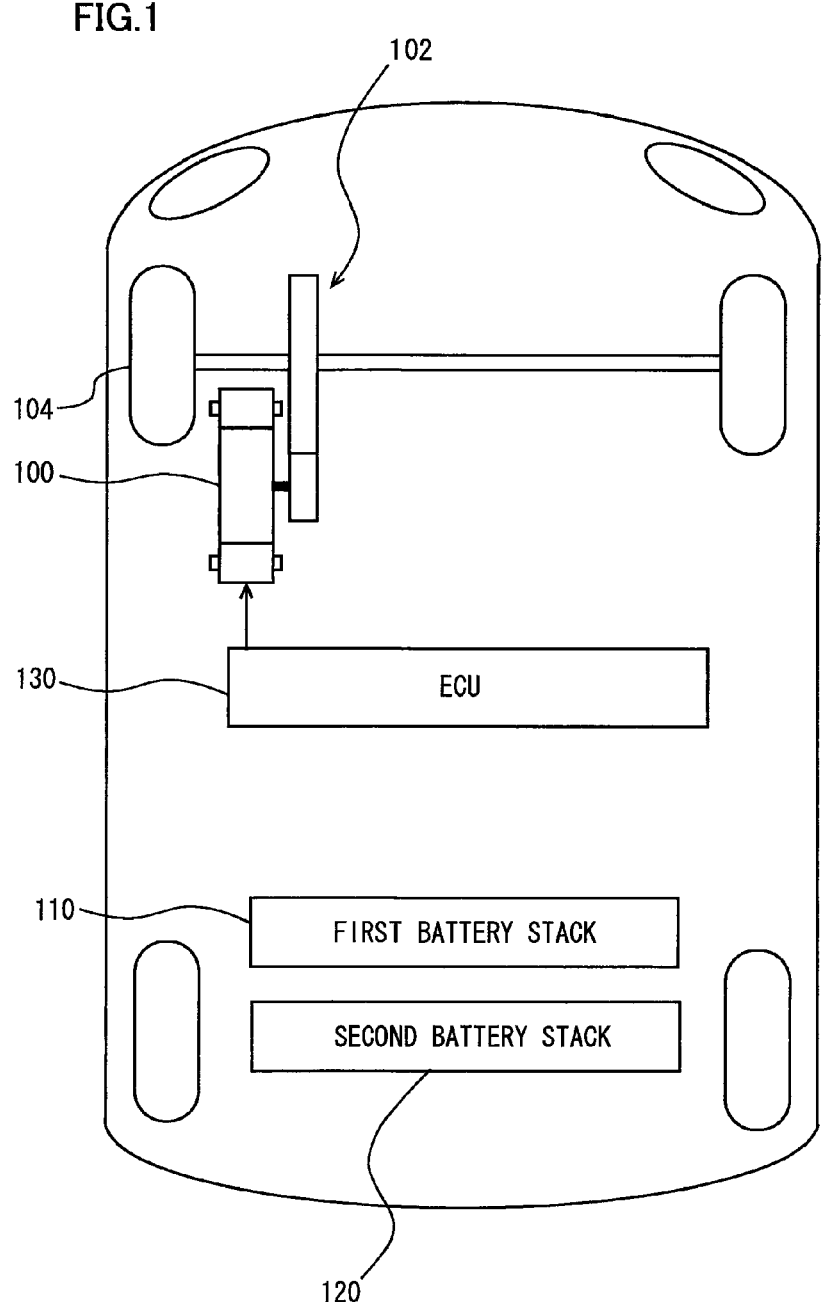
FIG. 1 is a schematic structural diagram illustrating an electric vehicle.

The embodiments of the present invention will be hereinafter described with reference to the accompanying drawings, in which the same components are designated by the same reference characters. Names and functions thereof are the same, and therefore, description thereof will not be repeated.

Referring to FIG. 1, an electric vehicle will be described. This electric vehicle is equipped with an electric motor 100, a first battery stack 110 and a second battery stack 120. The electric vehicle runs using electric motor 100 as a driving source supplied with electric power from first battery stack 110 and second battery stack 120. A hybrid vehicle equipped with an internal combustion engine in addition to electric motor 100 may be employed instead.

Electric motor 100 is controlled by an ECU (Electronic Control Unit) 130. ECU 130 may be divided into a plurality of ECUs.

Electric motor 100 is a three-phase alternating-current rotating electric machine having a U-phase coil, a V-phase coil and a W-phase coil. Electric motor 100 is driven by electric power stored in first battery stack 110 and second battery stack 120.

The driving force of electric motor 100 is transmitted to a driving wheel 104 via a reduction gear 102. Electric motor 100 thereby causes the vehicle to run. During regenerative braking of the electric vehicle, electric motor 100 is driven by driving wheel 104 via reduction gear 102 to thereby operate electric motor 100 as a power generator. Accordingly, electric motor 100 operates as a regenerative brake for converting braking energy into electric power. The electric power generated by electric motor 100 is stored in first battery stack 110 and second battery stack 120.

Each of first battery stack 110 and second battery stack 120 serves as a battery set having a configuration in which a plurality of battery modules each having a plurality of battery cells integrated with each other are connected in series. First battery stack 110 and second battery stack 120 are connected in parallel to each other. First battery stack 110 and second battery stack 120 are charged with electric power supplied from a power supply outside the vehicle, in addition to electric motor 100.

First battery stack 110 and second battery stack 120 are equal or substantially equal in capacity (a maximum charge amount that is rechargeable). The power storage system of the electric vehicle includes first battery stack 110 and second battery stack 120.

Figure 2:
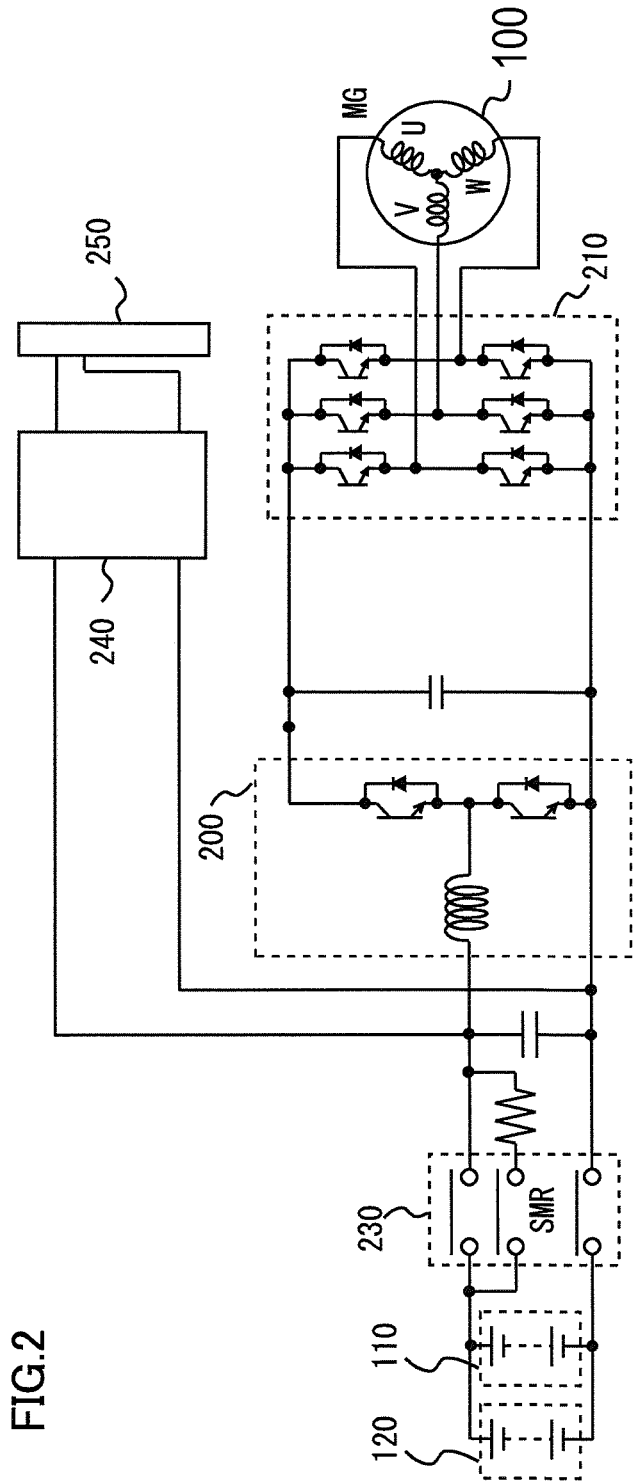
FIG. 2 is a (first) diagram illustrating an electric system of the electric vehicle.

With reference to FIG. 2, the electric system of the electric vehicle will now be described further. The electric vehicle is provided with a converter 200, an inverter 210, a system main relay 230, a charger 240, and an inlet 250.

Converter 200 includes a reactor, two npn-type transistors and two diodes. The reactor has its one end connected to the positive terminal side of each battery, and the other end connected to a connection point between the two npn-type transistors.

The two npn-type transistors are connected in series. The npn-type transistors are controlled by ECU 130. The diodes are respectively connected between the collector and the emitter of the respective npn-type transistors so as to flow current from the emitter to the collector.

The npn-type transistors may be implemented by IGBTs (Insulated Gate Bipolar Transistors). Instead of the npn-type transistors, power-switching elements such as power MOSFETs (Metal Oxide Semiconductor Field-Effect Transistors) can be used.

When electric power discharged from first battery stack 110 and second battery stack 120 is supplied to electric motor 100, converter 200 boosts the voltage. In contrast, when electric power generated by electric motor 100 is charged into first battery stack 110 and second battery stack 120, converter 200 down-converts the voltage.

Inverter 210 has a U-phase arm, a V-phase arm and a W-phase arm. The U-phase arm, V-phase arm and W-phase arm are connected in parallel. The U-phase arm, V-phase arm and W-phase arm each have two npn-type transistors connected in series. Between the collector and the emitter of each of the npn-type transistors, a diode is connected which flows current from the emitter to the collector. The connection point between the respective npn-type transistors in each arm is connected to an end of each coil of electric motor 100 other than the neutral point.

Inverter 210 converts a DC current supplied from first battery stack 110 and second battery stack 120 into an AC current for supply to electric motor 100. Inverter 210 also converts an AC current generated by electric motor 100 into a DC current.

System main relay 230 is provided between first battery stack 110 and converter 200. When system main relay 230 is opened, first battery stack 110 and second battery stack 120 are disconnected from the electric system. When system main relay 230 is closed, first battery stack 110 and second battery stack 120 are connected to the electric system.

The state of system main relay 230 is controlled by ECU 130. For example, when ECU 130 is activated, system main relay 230 is closed. When ECU 130 stops, system main relay 230 is opened.

Figure 3:
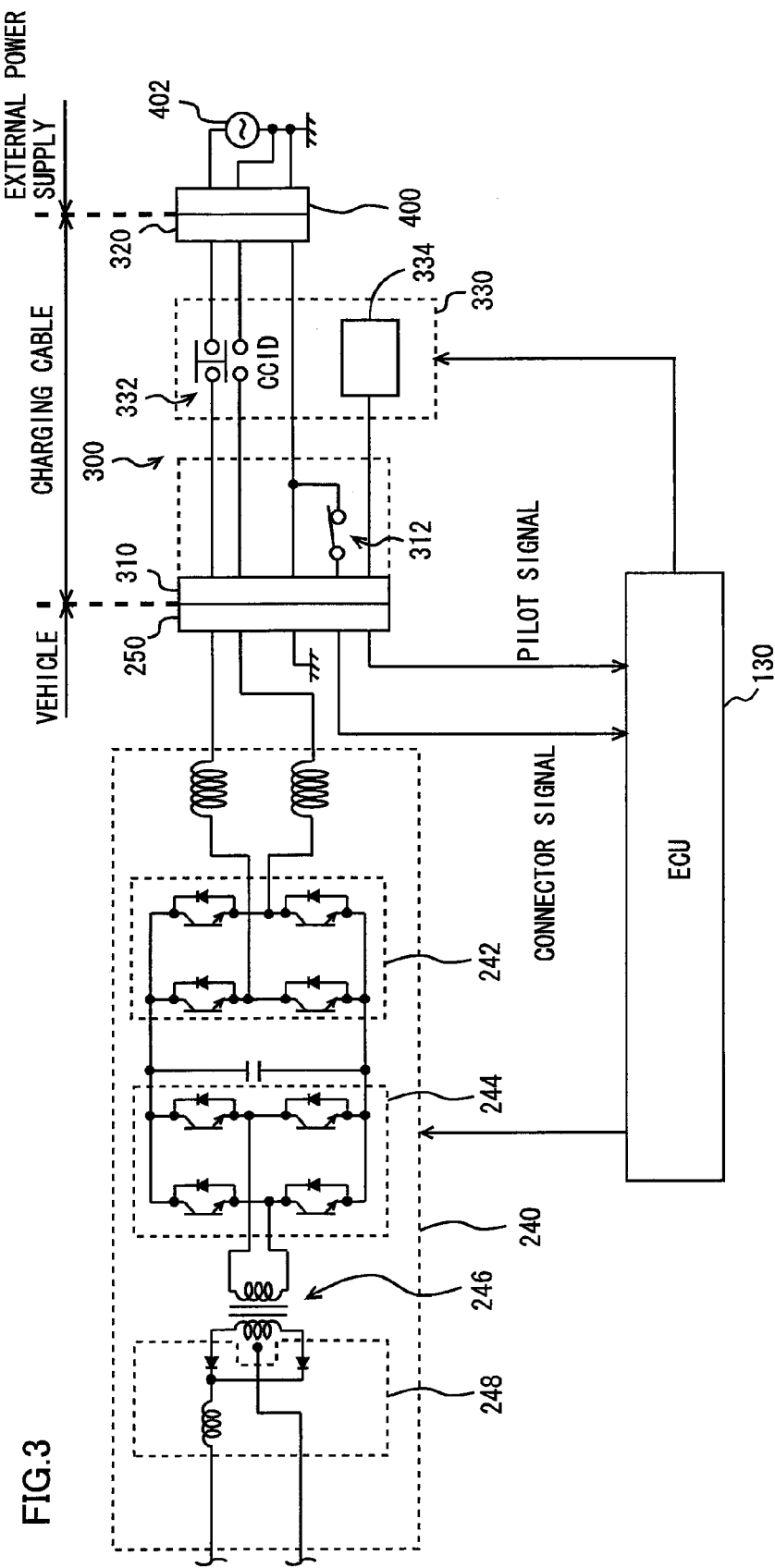
FIG. 3 is a (second) diagram illustrating the electric system of the electric vehicle.

Charger 240 is connected between system main relay 230 and converter 200. As shown in FIG. 3, charger 240 includes an AC/DC conversion circuit 242, a DC/AC conversion circuit 244, an insulation transformer 246, and a rectifier circuit 248.

AC/DC conversion circuit 242 is formed of a single-phase bridge circuit. AC/DC conversion circuit 242 converts AC power into DC power based on a driving signal from ECU 130. AC/DC conversion circuit 242 also serves as a boost chopper circuit that boosts the voltage by using the coils as the reactor.

DC/AC conversion circuit 244 is formed of a single-phase bridge circuit. DC/AC conversion circuit 244 converts DC power into high frequency AC power for output to insulation transformer 246, based on a driving signal from ECU 130.

Insulation transformer 246 includes a core made of a magnetic material, and a primary coil and a secondary coil wound around the coil. The primary coil and secondary coil are electrically insulated, and connected to DC/AC conversion circuit 244 and rectifier circuit 248, respectively. Insulation transformer 246 converts the high frequency AC power received from DC/AC conversion circuit 244 to assume a voltage level in accordance with a turn ratio of the primary coil and the secondary coil for output to rectifier circuit 248. Rectifier circuit 248 rectifies the AC power received from insulation transformer 246 into DC power.

When first battery stack 110 and second battery stack 120 are charged from the power supply outside the vehicle, ECU 130 generates a driving signal for driving charger 240 for output to charger 240.

Inlet 250 is provided on a side face of the electric vehicle, for example. A connector 310 of charging cable 300 coupling the electric vehicle and an external power supply 402 is connected to inlet 250.

Charging cable 300 coupling the electric vehicle and external power supply 402 includes connector 310, a plug 320, and a CCID (Charging Circuit Interrupt Device) 330.

Connector 310 of charging cable 300 is connected to inlet 250 provided on the electric vehicle. Connector 310 is provided with a switch 312. When switch 312 is closed with connector 310 of charging cable 300 being connected to inlet 250 provided on the electric vehicle, ECU 130 receives a connector signal CNCT indicating that connector 310 of charging cable 300 is connected to inlet 250 provided on the electric vehicle.

Switch 312 opens and closes in coordination with an anchor fitting anchoring connector 310 of charging cable 300 to inlet 250 of the electric vehicle. The anchor fitting swings by a user pressing a button provided on connector 310.

Figure 4:
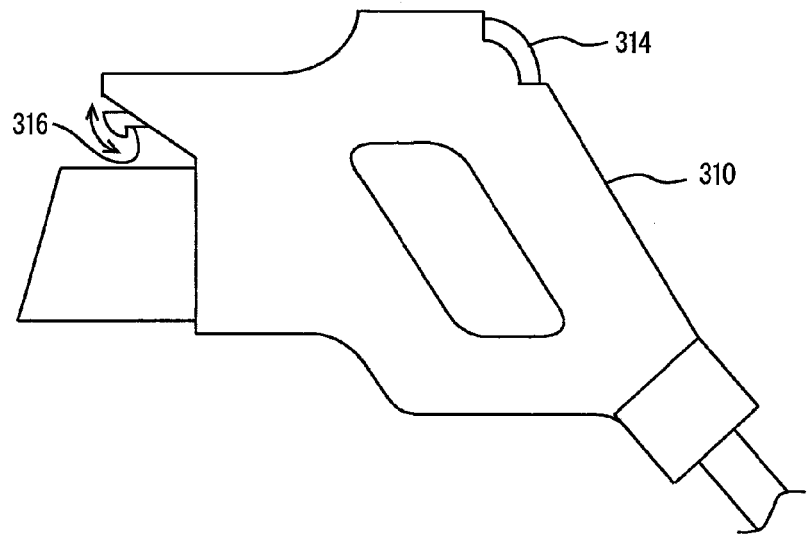
FIG. 4 is a diagram illustrating a connector of a charging cable.

For example, when the user moves the finger off a button 314 of connector 310 shown in FIG. 4 with connector 310 of charging cable 300 being connected to inlet 250 provided on the electric vehicle, an anchor fitting 316 engages with inlet 250 provided on the electric vehicle, and switch 312 is closed. When the user presses button 314, anchor fitting 316 is disengaged from inlet 250, and switch 312 is opened. It is to be noted that the method of opening and closing switch 312 is not limited thereto.

Referring back to FIG. 3, plug 320 of charging cable 300 is connected to an outlet 400 provided at a house. AC power is supplied from power supply 402 outside the electric vehicle to outlet 400.

CCID 330 has a relay 332 and a control pilot circuit 334. In the state where relay 332 is opened, the path is interrupted through which the electric power is supplied from power supply 402 outside the electric vehicle to the electric vehicle. In the state where relay 332 is closed, the electric power can be supplied from power supply 402 outside the electric vehicle to the electric vehicle. ECU 130 controls the state of relay 332 with connector 310 of charging cable 300 being connected to inlet 250 of the electric vehicle.

Control pilot circuit 334 transmits a pilot signal (square wave signal) CPLT to a control pilot line with plug 320 of charging cable 300 being connected to outlet 400, that is, external power supply 402, and with connector 310 being connected to inlet 250 provided on the electric vehicle. The pilot signal is oscillated by an oscillator provided in control pilot circuit 334.

When plug 320 of charging cable 300 is connected to outlet 400, control pilot circuit 334 may output a constant pilot signal CPLT even if connector 310 is disconnected from inlet 250 provided on the electric vehicle. However, ECU 130 cannot detect pilot signal CPLT output with connector 310 being disconnected from inlet 250 provided on the electric vehicle.

When plug 320 of charging cable 300 is connected to outlet 400 and connector 310 is connected to inlet 250 of the electric vehicle, control pilot circuit 334 oscillates pilot signal CPLT of a predetermined pulse width (duty cycle).

The electric vehicle is notified of the current capacity that can be supplied, in accordance with the pulse width of pilot signal CPLT. For example, the electric vehicle is notified of the current capacity of charging cable 300. The pulse width of pilot signal CPLT is constant independently of the voltage and the current of external power supply 402.

In the case where a different charging cable is used, the pulse width of pilot signal CPLT may vary. In other words, the pulse width of pilot signal CPLT may be set for each type of the charging cables.

In the present embodiment, the electric power supplied from external power supply 402 is charged into first battery stack 110 and second battery stack 120 with the electric vehicle and external power supply 402 being coupled to each other by charging cable 300. During charging of first battery stack 110 and second battery stack 120, system main relay 230 and relay 332 in CCID 330 are closed.

Figure 5:
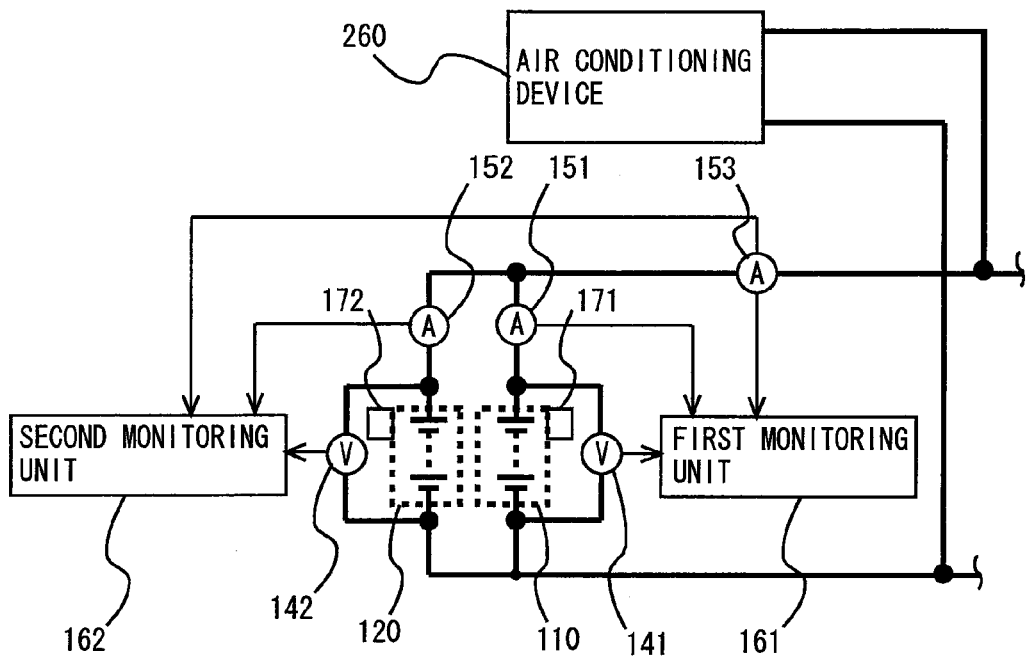
FIG. 5 is a diagram illustrating a power storage system.

With reference to FIG. 5, the power storage system will be described further. The power storage system includes first battery stack 110 and second battery stack 120. First battery stack 110 and second battery stack 120 are connected in parallel to each other. Alternatively, three or more battery stacks may be provided.

The voltage of first battery stack 110 is detected by a voltage sensor 141. The voltage of second battery stack 120 is detected by a voltage sensor 142.

The input and output current of first battery stack 110 is detected by a current sensor 151. The input and output current of second battery stack 120 is detected by a current sensor 152. An overall input and output current of first battery stack 110 and second battery stack 120, that is, the sum of the input and output current of first battery stack 110 and the input and output current of second battery stack 120 is detected by a current sensor 153.

First battery stack 110 and second battery stack 120 are not always equal in input and output current, since they are connected in parallel to each other. Accordingly, a first state of charge (SOC) S1 of first battery stack 110 and a second SOC S2 of second battery stack 120 may be different from each other. In the present embodiment, first SOC S1 of first battery stack 110 and second SOC S2 of second battery stack 120 are calculated individually.

First SOC S1 of first battery stack 110 is calculated by a first monitoring unit 161. First monitoring unit 161 calculates the SOC of first battery stack 110 based on the voltage of first battery stack 110, the input and output current of first battery stack 110, the overall input and output current of first battery stack 110 and second battery stack 120, and the like.

Similarly, second SOC S2 of second battery stack 120 is calculated by a second monitoring unit 162. Second monitoring unit 162 calculates the SOC of second battery stack 120 based on the voltage of second battery stack 120, the input and output current of second battery stack 120, the overall input and output current of first battery stack 110 and second battery stack 120, and the like.

First monitoring unit 161 and second monitoring unit 162 may be implemented as part of ECU 130. Since the SOC of each battery stack may be calculated using a well-known general technique, detailed description thereof will not be repeated.

In the present embodiment, ECU 130 receives data indicating the SOC of each battery stack. ECU 130 calculates the overall SOC, that is, a total SOC STOTAL of the power storage system, based on the SOC of each battery stack.

For example, total SOC STOTAL of the power storage system is calculated by obtaining an arithmetic average value of the SOCs of the respective battery stacks. Total SOC STOTAL of the power storage system may be calculated by obtaining a weighted average of the SOCs of the respective battery stacks. The sum of the SOCs of the respective battery stacks may be calculated as total SOC STOTAL of the power storage system.

ECU 130 further receives signals indicating the voltages detected by voltage sensors 141 and 142, and signals indicating the currents detected by current sensors 151, 152 and 153.

The temperature of first battery stack 110 is detected by a temperature sensor 171, and the temperature of second battery stack 120 is detected by a temperature sensor 172. ECU 130 receives signals indicating the temperatures detected by temperature sensors 171 and 172.

ECU 130 limits input and output power of each battery stack in accordance with the state of each battery stack. For example, the input and output power of each battery stack is limited based on the SOC of each battery stack, total SOC STOTAL of the power storage system, voltage, input and output current, temperature, and the like. The method of limiting the input/output power to/from each battery stack, that is, a charging current into each battery stack and a discharging current from each battery stack will be described later in detail.

As shown in FIG. 5, the electric vehicle has an air conditioning device 260. Air conditioning device 260 is electrically connected to the power storage system. More specifically, air conditioning device 260 is electrically connected to first battery stack 110 and second battery stack 120. Air conditioning device 260 is supplied with electric power from first battery stack 110 and second battery stack 120. Air conditioning device 260 is operated while consuming the supplied electric power.

Air conditioning device 260 is operated in accordance with a user's operation. In the present embodiment, for example, the user can operate air conditioning device 260 from outside the vehicle using a remote controller or the like during a stop of the vehicle. For example, the cooling or warming function of air conditioning device 260 can be activated before the user rides on the vehicle, so that the vehicle internal temperature can be made suitable.

Figure 6:
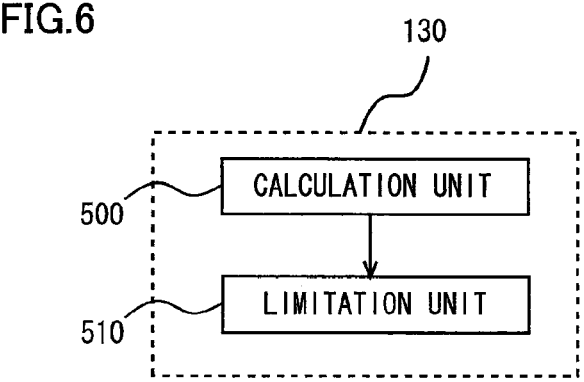
FIG. 6 is a functional block diagram of an ECU.

With reference to FIG. 6, the function of ECU 130 that limits electric power of the electric system will be described further. The function, which will be described below, may be implemented either by software or hardware.

ECU 130 includes a calculation unit 500 and a limitation unit 510. Calculation unit 500 calculates a limit value of electric power of each battery stack in accordance with the state of each battery stack. More specifically, a limit value WOUT of discharging power from each battery stack and a limit value WIN of charging power into each battery stack are calculated in accordance with a map having, as parameters, the SOC and the temperature of each battery stack, and the like. The map is created previously by a developer based on the results of experiments and simulations, and the like. It is to be noted that the method of calculating the limit values is not limited thereto.

In the present embodiment, limit value WOUT of discharging power is obtained as a positive value, and limit value WIN of charging power is obtained as a negative value. Accordingly, discharging power is expressed by a positive value, and charging power is expressed by a negative value. Both of limit value WOUT of discharging power and limit value WIN of charging power may be obtained as positive values. That is, both of the discharging power and charging power may be expressed by positive values.

In a first condition, limitation unit 510 limits the sum of electric power of plurality of first battery stack 110 and second battery stack 120 in accordance with the sum of a plurality of limit values. More specifically, the sum of discharging power from first battery stack 110 and discharging power from second battery stack 120 is limited in accordance with the sum of limit value WOUT of discharging power from first battery stack 110 and limit value WOUT of discharging power from second battery stack 120. For example, the absolute value of the sum of discharging power from first battery stack 110 and discharging power from second battery stack 120 is limited to be smaller than or equal to the absolute value of the sum of limit value WOUT of discharging power from first battery stack 110 and limit value WOUT of discharging power from second battery stack 120.

Also, the sum of charging power into first battery stack 110 and charging power into second battery stack 120 is limited in accordance with the sum of limit value WIN of charging power into first battery stack 110 and limit value WIN of charging power into second battery stack 120. For example, the absolute value of the sum of charging power into first battery stack 110 and charging power into second battery stack 120 is limited to be smaller than or equal to the absolute value of the sum of limit value WIN of charging power into first battery stack 110 and limit value WIN of charging power into second battery stack 120.

The first condition is a condition in which a driver requests a greater acceleration than in a second condition which will be described later. More specifically, the first condition includes a condition in which electric motor 100 is controlled so as to generate the driving force of the vehicle. Therefore, when electric motor 100 is controlled so as to generate the driving force, the sum of electric power of plurality of battery stacks 110 and 120 is limited in accordance with the sum of a plurality of limit values.

When electric motor 100 is controlled so as to generate the driving force, the vehicle moves forward or backward. The driving force generated by electric motor 100 is determined in accordance with, for example, a map having, as parameters, the accelerator pedal position, the vehicle speed and the like. Electric motor 100 is controlled so as to achieve the determined driving force. That is, electric power necessary for achieving the determined driving force is supplied from the power storage system to electric motor 100. Electric motor 100 is supplied with electric power obtained by subtracting losses and the like from the sum of discharging power from first battery stack 110 and discharging power from second battery stack 120.

In the second condition, limitation unit 510 limits electric power of battery stacks 110 and 120 in accordance with any of the plurality of limit values. For example, the sum of the plurality of battery stacks is limited in accordance with a limit value having a smaller absolute value among the plurality of limit values.

More specifically, the absolute value of the sum of discharging power from first battery stack 110 and discharging power from second battery stack 120 is limited to be smaller than or equal to twice the absolute value of one of limit value WOUT of discharging power from first battery stack 110 and limit value WOUT of discharging power from second battery stack 120 that has a smaller absolute value. That is, the sum of discharging power from first battery stack 110 and discharging power from second battery stack 120 is limited to be smaller than or equal to twice the smaller limit value WOUT.

Similarly, the sum of charging power into first battery stack 110 and charging power into second battery stack 120 is limited to be smaller than or equal to twice the absolute value of one of limit value WIN of charging power to first battery stack 110 and limit value WIN of charging power to second battery stack 120 that has a smaller absolute value. That is, the sum of charging power to first battery stack 110 and charging power to second battery stack 120 is limited to be larger than or equal to twice the larger limit value WIN.

Further, electric power of each battery stack is limited in accordance with the limit value of electric power of each battery stack. More specifically, discharging power from first battery stack 110 is limited in accordance with limit value WOUT of discharging power from first battery stack 110. Similarly, discharging power from second battery stack 120 is limited in accordance with limit value WOUT of discharging power from second battery stack 120.

For example, feedback control is adopted to limit the absolute value of discharging power from first battery stack 110 to be smaller than or equal to the absolute value of limit value WOUT of discharging power from first battery stack 110. Similarly, the absolute value of discharging power from second battery stack 120 is limited to be smaller than or equal to the absolute value of limit value WOUT of discharging power from second battery stack 120.

Further, charging power into first battery stack 110 is limited in accordance with limit value WIN of charging power into first battery stack 110. Similarly, charging power into second battery stack 120 is limited in accordance with limit value WIN of charging power into second battery stack 120.

For example, feedback control is adopted to limit the absolute value of charging power into first battery stack 110 to be smaller than or equal to the absolute value of limit value WIN of charging power into first battery stack 110. Similarly, the absolute value of charging power into second battery stack 120 is limited to be smaller than or equal to the absolute value of limit value WIN of charging power into second battery stack 120.

In the first condition in addition to the second condition, limitation unit 510 limits electric power of first battery stack 110 and second battery stack 120 in accordance with any of the plurality of limit values. For example, as described above, in the first condition, the sum of charging power into first battery stack 110 and charging power into second battery stack 120 is limited in accordance with the sum of limit value WIN of charging power into first battery stack 110 and limit value WIN of charging power into second battery stack 120. In addition, in the first condition, electric power of each battery stack is limited in accordance with the limit value of electric power of each battery stack. The method of limiting electric power of each battery stack in accordance with the limit value of electric power of each battery stack has been described above, and the description is not repeated here.

The second condition includes a condition in which electric motor 100 is controlled so as to generate the braking force, for example. When electric motor 100 is controlled so as to generate the braking force, electric motor 100 is driven by driving wheel 104 via reduction gear 102, so that electric motor 100 operates as a generator. That is, electric motor 100 operates as a regenerative brake. Accordingly, when electric motor 100 is controlled so as to generate the braking force, regenerative braking is carried out. It is to be noted that the regenerative braking achieved by electric motor 100 may also be called engine braking although not achieved by the engine.

The second condition includes the condition in which air conditioning device 260 is operated, in addition to the condition in which electric motor 100 is controlled so as to generate the braking force. More specifically, the condition in which air conditioning device 260 is operated is the condition in which air conditioning device 260 is operated during a stop of the vehicle before a user rides on the vehicle.

In other words, the second condition includes a condition in which the acceleration is zero and a condition in which the acceleration is smaller than zero (having a negative value). Accordingly, the vehicle acceleration in the second condition is smaller than that in the first condition.

Figure 7:
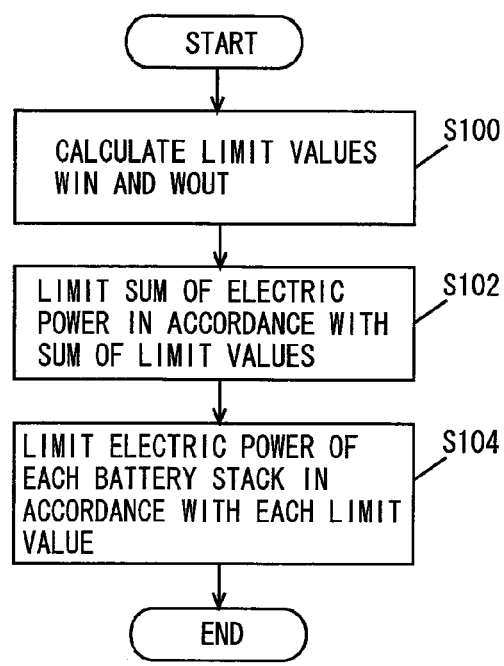
FIG. 7 is a (first) flow chart illustrating a control structure of a process executed by the ECU.

With reference to FIG. 7, a process executed by the ECU for limiting electric power in the condition in which electric motor 100 is controlled so as to generate the driving force will be described.

At a step (hereinafter step is abbreviated to S) 100, ECU 130 calculates limit value WOUT of discharging power from each battery stack and limit value WIN of charging power into each battery stack.

At S102, ECU130 limits the sum of electric power of plurality of battery stacks 110 and 120 in accordance with the sum of the plurality of limit values. More specifically, the sum of discharging power from first battery stack 110 and discharging power from second battery stack 120 is limited to be smaller than or equal to the sum of limit value WOUT of discharging power from first battery stack 110 and limit value WOUT of discharging power from second battery stack 120.

Electric power is thereby limited in the overall system. Accordingly, electric motor 100 is supplied with electric power in a range available for the overall system. Electric power sufficient for the vehicle to run can thus be ensured.

At S104, ECU130 limits electric power of each battery stack in accordance with the limit value of electric power of each battery stack. More specifically, discharging power from first battery stack 110 is limited to be smaller than or equal to limit value WOUT of discharging power from first battery stack 110. Similarly, discharging power from second battery stack 120 is limited to be smaller than or equal to limit value WOUT of discharging power from second battery stack 120.

This ensures that discharging power from each battery stack is limited. Accordingly, each battery stack is protected against overdischarging.

Figure 8:
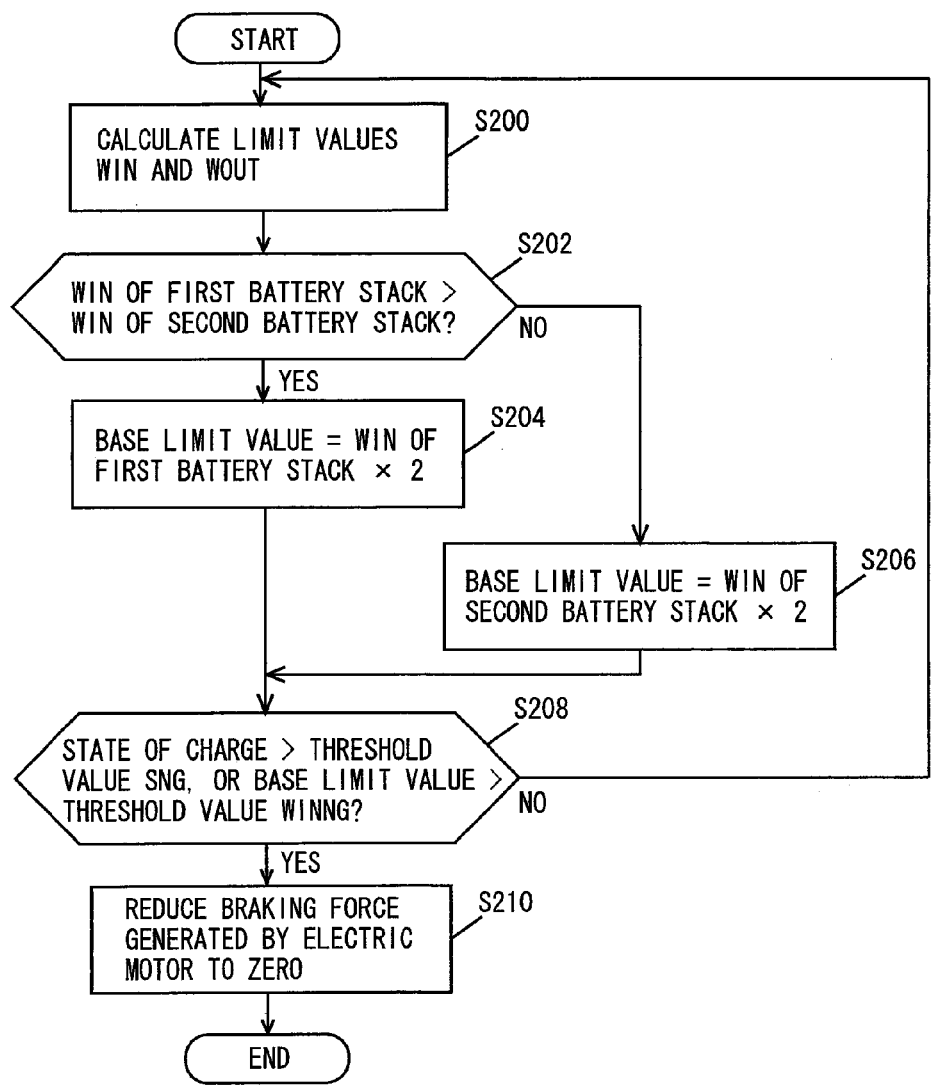
FIG. 8 is a (second) flow chart illustrating a control structure of a process executed by the ECU.

With reference to FIG. 8, a process executed by the ECU for limiting electric power in the condition in which electric motor 100 is controlled so as to generate the braking force will be described.

At S200, ECU130 calculates limit value WOUT of discharging power from each battery stack and limit value WIN of charging power into each battery stack.

At S202, ECU130 determines whether or not limit value WIN of charging power into first battery stack 110 is larger than limit value WIN of charging power into second battery stack 120. Since limit value WIN of charging power is obtained as a negative value, a determination is made whether or not the absolute value of limit value WIN of charging power into first battery stack 110 is smaller than the absolute value of limit value WIN of charging power into second battery stack 120.

When limit value WIN of charging power into first battery stack 110 is larger than limit value WIN of charging power into second battery stack 120 (YES at S202), the process proceeds into S204. When limit value WIN of charging power into second battery stack 120 is larger than limit value WIN of charging power into first battery stack 110 (NO at S202), the process proceeds into S206.

At S204, ECU130 sets a base limit value at twice limit value WIN of charging power into first battery stack 110. Accordingly, the base limit value is set at twice one of limit value WIN of charging power into first battery stack 110 and limit value WIN of charging power into second battery stack 120 that has a smaller absolute value.

At S206, ECU130 sets the base limit value at twice limit value WIN of charging power into second battery stack 120.

At S208, ECU130 determines whether or not total SOC STOTAL of the power storage system is higher than a predetermined threshold value SNG or the base limit value is larger than a predetermined threshold value WINNG (WINNG<0). Since the base limit value is a negative value, a determination is made whether or not the absolute value of the base limit value is smaller than the absolute value of threshold value WINNG. It is to be noted that threshold value SNG and threshold value WINNG may have hystereses.

When total SOC STOTAL of the power storage system is higher than predetermined threshold value SNG or the base limit value is larger than threshold value WINNG (YES at S208), the process proceeds into S210. Otherwise (NO at S208), the process returns to S200. That is, braking by the braking force generated by electric motor 100 is continued.

At S210, ECU130 reduces the braking force generated by electric motor 100 to zero. Accordingly, regenerated electric power becomes zero, so that charging power into the power storage system, that is, the sum of charging power into first battery stack 110 and charging power into second battery stack 120 becomes zero. Charging power into each battery stack is thereby limited. Particularly, a battery stack having a large limit value WIN is protected against overcharging.

Figure 9:
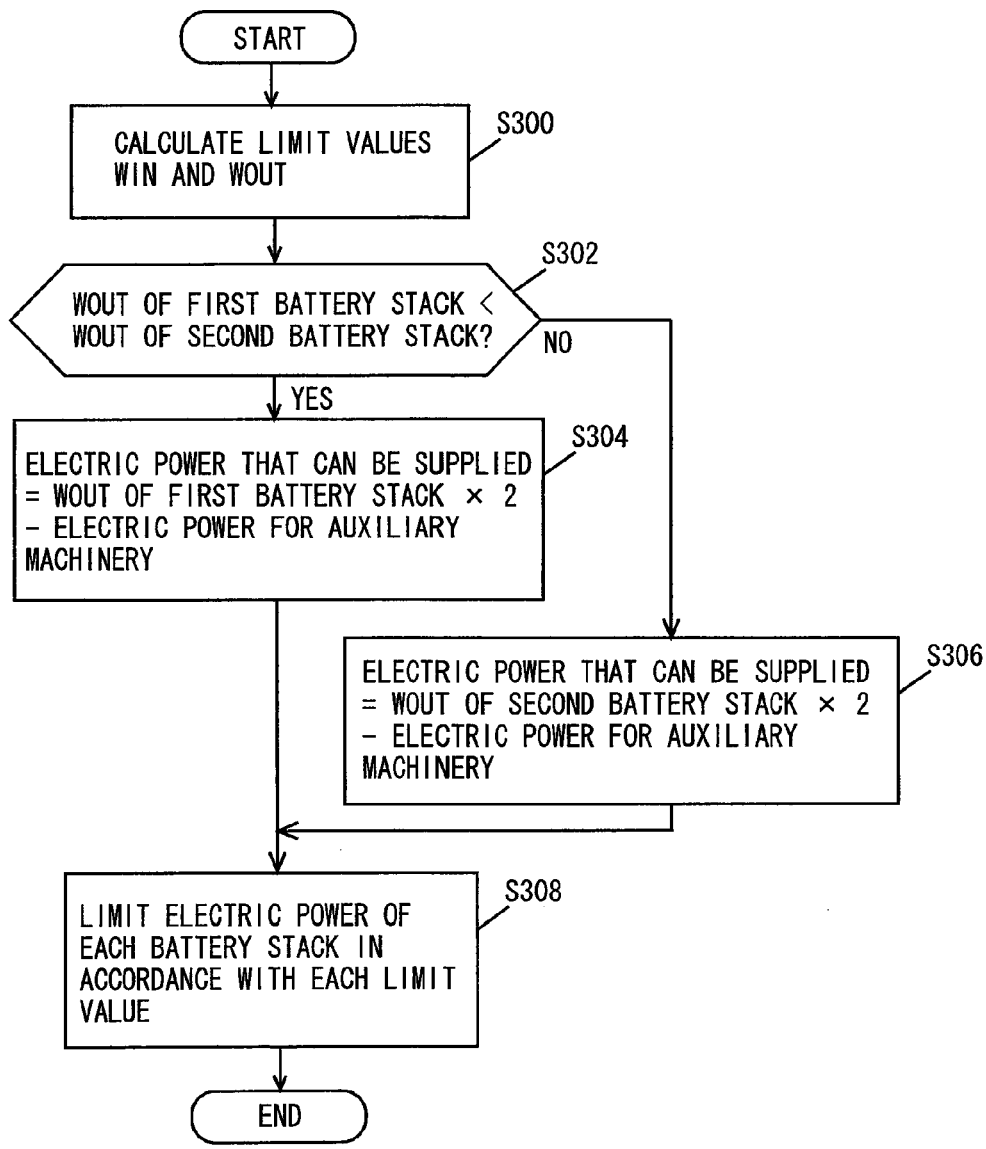
FIG. 9 is a (third) flow chart illustrating a control structure of a process executed by the ECU.

With reference to FIG. 9, a (first) process executed by the ECU for limiting electric power in the condition in which air conditioning device 260 is operated during a stop of the vehicle.

At S300, ECU130 calculates limit value WOUT of discharging power from each battery stack and limit value WIN of charging power into each battery stack.

At S302, ECU130 determines whether or not limit value WOUT of discharging power from first battery stack 110 is smaller than limit value WOUT of discharging power from second battery stack 120. Since limit value WOUT of discharging power is obtained as a positive value, a determination is made whether or not the absolute value of limit value WOUT of discharging power from first battery stack 110 is smaller than the absolute value of limit value WOUT of discharging power from second battery stack 120.

When limit value WOUT of discharging power from first battery stack 110 is smaller than limit value WOUT of discharging power from second battery stack 120 (YES at S302), the process proceeds into S304. When limit value WOUT of discharging power from second battery stack 120 is smaller than limit value WOUT of discharging power from first battery stack 110 (NO at S302), the process proceeds into S306.

At S304, ECU130 sets electric power that can be supplied from the power storage system to air conditioning device 260 at a value obtained by subtracting electric power consumed by auxiliary machinery (a motor-driven water pump, a motor-driven oil pump, a motor-driven fan, etc.) from twice limit value WOUT of discharging power from first battery stack

110. Air conditioning device 260 is supplied with electric power smaller than or equal to the set electric power that can be supplied.

More specifically, the sum of discharging power from first battery stack 110 and discharging power from second battery stack 120 is limited to be smaller than twice one of limit value WOUT of limit value WOUT of discharging power from first battery stack 110 and limit value WOUT of discharging power from second battery stack 120 that has a smaller absolute value. Discharging power from each battery stack is thereby limited. Particularly, a battery stack having a small limit value WOUT is protected against overdischarging.

At S306, ECU130 sets electric power that can be supplied from the power storage system to air conditioning device 260 at a value obtained by subtracting electric power consumed by the auxiliary machinery from twice limit value WOUT of discharging power from second battery stack 120.

At S308, ECU130 limits electric power of each battery stack in accordance with the limit value of electric power of each battery stack. More specifically, discharging power from first battery stack 110 is limited to be smaller than or equal to limit value WOUT of discharging power from first battery stack 110. Similarly, discharging power from second battery stack 120 is limited to be smaller than or equal to limit value WOUT of discharging power from second battery stack 120. Each battery stack is thereby protected against overdischarging.

Figure 10:
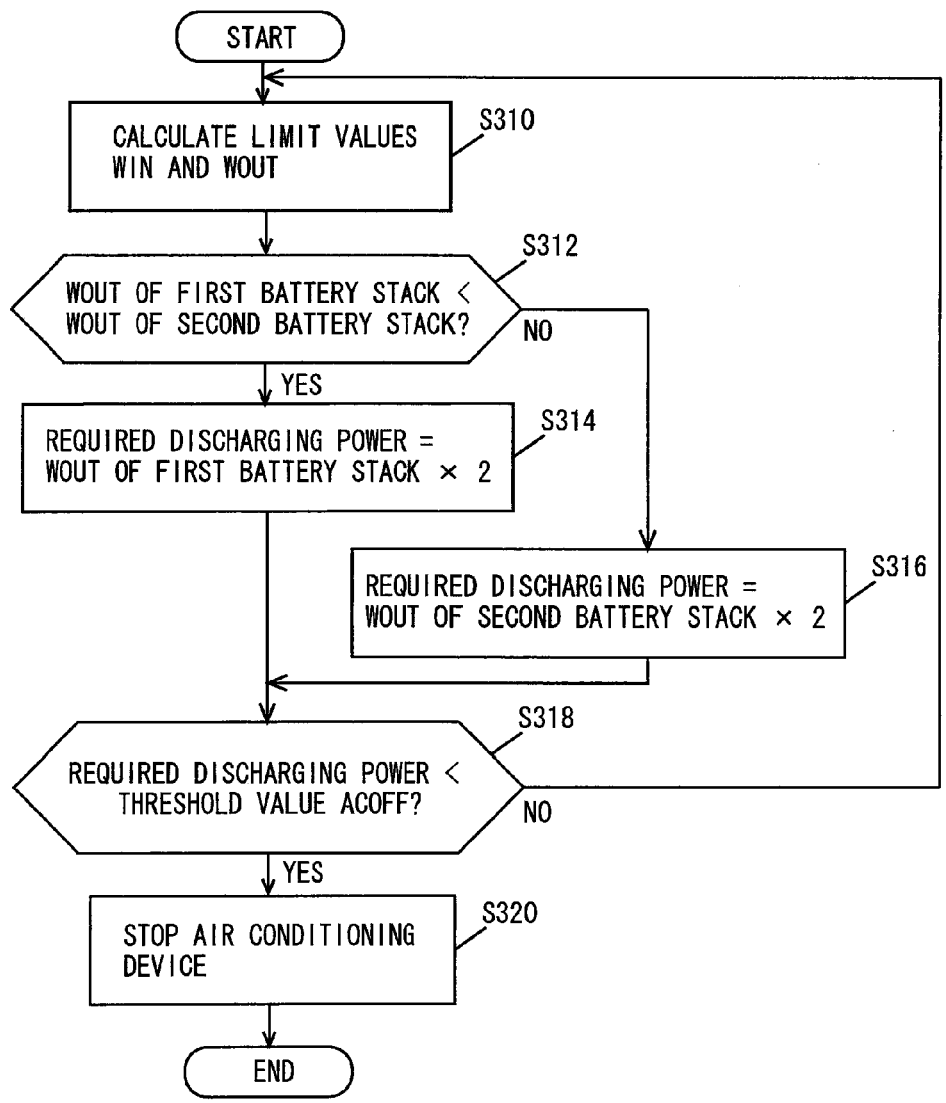
FIG. 10 is a (fourth) flow chart illustrating a control structure of a process executed by the ECU.

With reference to FIG. 10, a (second) process executed by the ECU for limiting electric power in the condition in which air conditioning device 260 is operated during a stop of the vehicle.

At S310, ECU130 calculates limit value WOUT of discharging power from each battery stack and limit value WIN of charging power into each battery stack.

At S312, ECU130 determines whether or not limit value WOUT of discharging power from first battery stack 110 is smaller than limit value WOUT of discharging power from second battery stack 120.

When limit value WOUT of discharging power from first battery stack 110 is smaller than limit value WOUT of discharging power from second battery stack 120 (YES at S312), the process proceeds into S314. When limit value WOUT of discharging power from second battery stack 120 is smaller than limit value WOUT of discharging power from first battery stack 110 (NO at S312), the process proceeds into S316.

At S314, ECU130 sets required discharging power at twice limit value WOUT of discharging power from first battery stack 110.

At S316, ECU130 sets required discharging power at twice limit value WOUT of discharging power from second battery stack 120.

At S318, ECU130 determines whether or not the required discharging power is smaller than a threshold value ACOFF. When the required discharging power is smaller than threshold value ACOFF (YES at S318), the process proceeds into S312. When the required discharging power is larger than or equal to a threshold value ACOFF (NO at S318), the process returns to S310. That is, the operation of air conditioning device 260 is continued.

At S320, ECU130 stops air conditioning device 260. Discharging power from each battery stack is thereby limited. Particularly, a battery stack having a small limit value WOUT is protected against overdischarging.

As described above, according to the present embodiment, a selection is made depending on a driving state of the vehicle between the mode of limiting electric power in the overall system in accordance with the sum of limit values of electric power and the mode of limiting electric power in accordance with a limit value having a smaller absolute value. When electric power is limited in the overall system, the electric motor is supplied with electric power in a range available for the overall system. Electric power sufficient for the vehicle to run can thus be ensured. When electric power is limited in accordance with a limit value having a smaller absolute value, electric power is limited for each power storage device. This ensures that electric power of each power storage device is limited. As a result, compatibility is achieved between limitation of electric power and ensuring of sufficient electric power.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power limiting apparatus for an electric system including an electric motor mounted on a vehicle as a driving source and a plurality of power storage devices electrically connected to said electric motor, comprising:
    means for calculating a limit value of electric power of each of said power storage devices;
    means for limiting a sum of electric power of the plurality of said power storage devices in accordance with a sum of a plurality of said limit values in a first condition in which said electric motor is controlled so as to generate a driving force; and
    means for limiting the sum of electric power of the plurality of said power storage devices in accordance with one of the plurality of said limit values that has a smaller absolute value in a second condition in which said electric motor is controlled so as to generate a braking force.

2. The power limiting apparatus for an electric system according to claim 1, wherein
    said vehicle has mounted thereon an air conditioning device electrically connected to said electric system, and
    said second condition further includes a condition in which said air conditioning device is operated during a stop of the vehicle, in addition to the condition in which said electric motor is controlled so as to generate the braking force.

3. A power limiting apparatus for an electric system including an electric motor mounted on a vehicle as a driving source and a plurality of power storage devices electrically connected to said electric motor, comprising:
    means for calculating a limit value of electric power of each of said power storage devices;
    means for limiting a sum of electric power of the plurality of said power storage devices in accordance with a sum of the plurality of said limit values and limiting electric power of each of said power storage devices in accordance with each of said limit values in a first condition in which said electric motor is controlled so as to generate a driving force; and
    means for limiting the sum of electric power of the plurality of said power storage devices in accordance with one of the plurality of said limit values that has a smaller absolute value in a second condition in which said electric motor is controlled so as to generate a braking force.

4. The power limiting apparatus for an electric system according to claim 3, wherein
    said vehicle has mounted thereon an air conditioning device electrically connected to said electric system, and
    said second condition further includes a condition in which said air conditioning device is operated during a stop of the vehicle, in addition to the condition in which said electric motor is controlled so as to generate the braking force.

5. A power limiting apparatus for an electric system including an electric motor mounted on a vehicle as a driving source and a plurality of power storage devices electrically connected to said electric motor, comprising:
  means for calculating a limit value of electric power of each of said power storage devices;
  means for limiting a sum of electric power of the plurality of said power storage devices in accordance with a sum of the plurality of said limit values in a first condition in which said electric motor is controlled so as to generate a driving force; and
  means for limiting the sum of electric power of the plurality of said power storage devices in accordance with one of the plurality of said limit values that has a smaller absolute value, and limiting electric power of each of said power storage devices in accordance with each of said limit values in a second condition in which said electric motor is controlled so as to generate a braking force.

6. The power limiting apparatus for an electric system according to claim 5, wherein
  said vehicle has mounted thereon an air conditioning device electrically connected to said electric system, and
  said second condition further includes a condition in which said air conditioning device is operated during a stop of the vehicle, in addition to the condition in which said electric motor is controlled so as to generate the braking force.

7. An electric system comprising:
  an electric motor mounted on a vehicle as a driving source;
  a plurality of power storage devices electrically connected to said electric motor; and
  a control unit that
  calculates a limit value of electric power of each of said power storage devices,
  limits a sum of electric power of the plurality of said power storage devices in accordance with a sum of a plurality of said limit values in a first condition in which said electric motor is controlled so as to generate a driving force, and
  limits the sum of electric power of the plurality of said power storage devices in accordance with one of the plurality of said limit values that has a smaller absolute value in a second condition in which said electric motor is controlled so as to generate a braking force.

8. An electric system comprising:
  an electric motor mounted on a vehicle as a driving source;
  a plurality of power storage devices electrically connected to said electric motor; and
  a control unit that
  calculates a limit value of electric power of each of said power storage devices,
  limits a sum of electric power of the plurality of said power storage devices in accordance with a sum of a plurality of said limit values and limits electric power of each of said power storage devices in accordance with each of said limit values in a first condition in which said electric motor is controlled so as to generate a driving force, and
  limits the sum of electric power of the plurality of said power storage devices in accordance with one of the plurality of said limit values that has a smaller absolute value in a second condition in which said electric motor is controlled so as to generate a braking force.

9. An electric system comprising:
  an electric motor mounted on a vehicle as a driving source;
  a plurality of power storage devices electrically connected to said electric motor; and
  a control unit that
  calculates a limit value of electric power of each of said power storage devices,
  limits a sum of electric power of the plurality of said power storage devices in accordance with a sum of a plurality of said limit values in a first condition in which said electric motor is controlled so as to generate a driving force, and
  limits the sum of electric power of the plurality of said power storage devices in accordance with one of the plurality of said limit values that has a smaller absolute value and limits electric power of each of said power storage devices in accordance with each of said limit values in a second condition in which said electric motor is controlled so as to generate a braking force.

* * * * *